United States Patent
Tachibana

(10) Patent No.: US 11,740,541 B2
(45) Date of Patent: Aug. 29, 2023

(54) BRACKET FOR VEHICLE MOUNT CAMERA

(71) Applicant: NIFCO INC., Yokosuka (JP)

(72) Inventor: Norihide Tachibana, Yokosuka (JP)

(73) Assignee: NIFCO INC., Yokosuka (JP)

( * ) Notice: Subject to any disclaimer, the term of this patent is extended or adjusted under 35 U.S.C. 154(b) by 244 days.

(21) Appl. No.: 17/414,384

(22) PCT Filed: Jan. 17, 2020

(86) PCT No.: PCT/JP2020/001465
§ 371 (c)(1),
(2) Date: Jun. 16, 2021

(87) PCT Pub. No.: WO2020/158449
PCT Pub. Date: Aug. 6, 2020

(65) Prior Publication Data
US 2022/0050363 A1   Feb. 17, 2022

(30) Foreign Application Priority Data
Jan. 29, 2019 (JP) .................................. 2019-012894

(51) Int. Cl.
  *G03B 17/56*  (2021.01)
  *B60R 11/04*  (2006.01)
(52) U.S. Cl.
  CPC ............ *G03B 17/561* (2013.01); *B60R 11/04* (2013.01)
(58) Field of Classification Search
  CPC .............................. G03B 17/561; B60R 11/04
  See application file for complete search history.

(56) References Cited

U.S. PATENT DOCUMENTS

| | | |
|---|---|---|
| 10,336,264 B2 | 7/2019 | Okuda |
| 10,471,906 B2 | 11/2019 | Kasai et al. |
| 2018/0239223 A1 * | 8/2018 | Blake, III .............. G03B 17/55 |
| 2019/0381953 A1 | 12/2019 | Ohsumi et al. |

FOREIGN PATENT DOCUMENTS

| | | | |
|---|---|---|---|
| JP | 5853795 B2 | 2/2016 | |
| JP | 2017-171168 A | 9/2017 | |
| JP | 2018-165127 A | 10/2018 | |
| KR | 20150066770 A * | 7/2015 | ........... G03B 17/561 |

OTHER PUBLICATIONS

PCT/ISA/210, "International Search Report for International Application No. PCT/JP2020/001465," dated Feb. 25, 2020.

* cited by examiner

*Primary Examiner* — Minh Q Phan
(74) *Attorney, Agent, or Firm* — Manabu Kanesaka

(57) ABSTRACT

A bracket includes a base portion arranged to be fixed to a face inside the window glass, and an engagement piece, an engagement portion thereof engaging an end of the vehicle mount camera located at a rear side in a sliding movement by a sliding operation of the vehicle mount camera. The engagement piece includes a fixed end integrated with the base portion, and a free end arranged with a space relative to the fixed end in a vehicle front-rear direction, the engagement portion being provided at the free end so that the sliding operation of the vehicle mount camera is made by an elastic deformation of the engagement piece through an abutment of the engagement portion to the vehicle mount camera, and an engagement of the engagement portion is made by an elastic recovery of the engagement piece at an end position of the sliding operation.

5 Claims, 5 Drawing Sheets

BRACKET FOR VEHICLE MOUNT CAMERA

FIELD OF THE INVENTION

The present invention relates to an improvement of a bracket used for attaching a vehicle mount camera to a window glass.

BACKGROUND OF THE INVENTION

There is a patent document 1 as a bracket for attaching, to a front window, a vehicle mount camera for taking an outside image through the front window of a vehicle. In this bracket, an upper face thereof is made to an attaching portion adhered to a face at the front glass inside the vehicle, and a rear end hanging down from an end positioned at a rear side of the vehicle includes a plate spring. In this bracket, by slide-moving the vehicle mount camera from the lower side to an obliquely upper side, a back side of the vehicle mount camera is pushed to the plate spring while elastically deforming the plate spring, to thereby combine the vehicle mount camera to the bracket. By elastic return of the plate spring after stopping of the slide movement of the vehicle mount camera, the vehicle mount camera is engaged with the bracket.

PRIOR ART DOCUMENT

Patent Document 1: Japanese Patent No. 5853795

SUMMARY OF THE INVENTION

Problem to be Solved by the Invention

In the bracket shown in the Patent Document 1, since the plate spring pushing from the back side of the vehicle is required at the rear side of the vehicle mount camera combined therewith, it is difficult to minimize the size of the bracket in the front-back direction of the vehicle. Also, since the vehicle mount camera combined with the bracket is held by the urging force of the plate spring, rattling of the vehicle mount camera can not be completely prevented.

The main subject to be solved by the present invention is to make this kind of bracket for the vehicle mount camera compact practically and properly.

Means for Solving the Problems

In order to solve the problem, in the present invention, a bracket for attaching to a window glass a vehicle mount camera for taking an image outside a vehicle through the window glass, comprises:

a base portion arranged to be fixed to a face inside the window glass, and an engagement piece, an engagement portion thereof engaging an end of the vehicle mount camera located at a rear side in a sliding movement by a sliding operation of the vehicle mount camera, wherein the engagement piece includes a fixed end integrated with the base portion, and a free end arranged with a space relative to the fixed end in a vehicle front-rear direction, the engagement portion being provided at the free end so that the sliding operation of the vehicle mount camera is made by an elastic deformation of the engagement piece through an abutment of the engagement portion to the vehicle mount camera, and an engagement of the engagement portion is made by an elastic recovery of the engagement piece at an end position of the sliding operation.

In this structure, from a state that the bracket is fixed to the window glass, by fixing the vehicle mount camera to the bracket by the sliding operation of the vehicle mount camera, the engagement portion of the engagement piece is engaged to the end of the vehicle mount camera located at the rear side in the sliding movement with one touch, to thereby stably attach the vehicle mount camera to the window glass. Namely, in the engagement, the vehicle mount camera is prevented from a movement reverse to the sliding movement, and is retained in the predetermined fixing position relative to the bracket, The engagement piece has a structure such that the engagement piece is integrally fixed, at the fixed end, to the base portion fixed to the window glass, and has the engagement portion at the free end arranged with a space with respect the fixed end in the vehicle front-rear direction, the bracket does not need to provide a portion facing an end located at the rear side of the vehicle mount camera in the movement and to have a spring and so on elastically pushing from the portion to the end located at the rear end side in the movement of the vehicle mount camera, to thereby minimize the size of the bracket in the vehicle front-rear direction. Namely, this structure makes the bracket compact, and enhances the free designing of the bracket, as well as simplifies the structure of the bracket. Also, this structure minimizes the area where the bracket occupies the window glass.

In one embodiment of the invention, the bracket is an injection molded product of a synthetic resin.

In one embodiment of the invention, the engagement portion has a projection shape projecting downwardly, a contact face at one side in two sides with a top portion therebetween, contacting the vehicle mount camera at a time of engagement with the vehicle mount camera, and an inclined face at another side with respect to the top portion.

Advantages of the Invention

In accordance with the invention, the bracket for the vehicle mount camera can be properly and rationally made compact.

EMBODIMENT OF THE INVENTION

Herein after, the typical embodiment of the invention is explained based on FIGS. 1-7. A bracket 3 of the embodiment is designed to attach a vehicle mount camera 2, for taking an outside image through a window glass of a vehicle, to the window glass. Typically, the bracket 3 is used to attach the vehicle mount camera 2, for taking the outside image through the window glass of the vehicle, to the window glass 1. Incidentally, the vehicle mount camera of the specification means a camera in a narrow meaning as well as a known device, such as a sensor receiving optical information.

Figure 7:
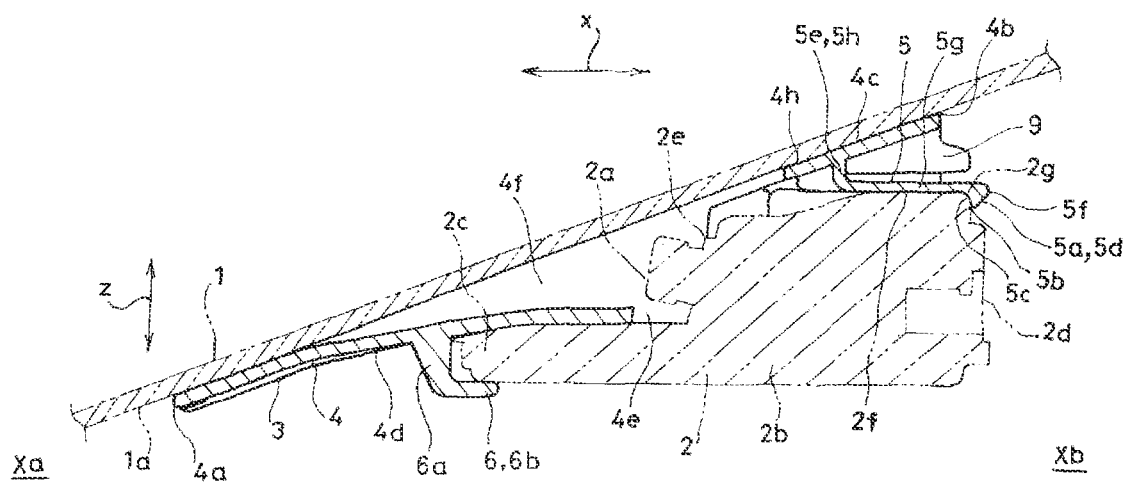
FIG. 7 a cross-sectional view taken along a line A-A in FIG. 5, showing a state wherein the bracket is fixed to the window glass in combination with the vehicle mount camera, and the camera is shown by an imaginary line (two dot lines).

In FIG. 7, numeral 1 is a front window, numeral 3 is a bracket, numeral 2 is a vehicle mount camera. A front-rear direction of the vehicle is indicated as x in FIG. 1, a front side of the vehicles is indicated as xa in FIG. 1, and a rear side of the vehicle is indicated as xb in FIG. 1, Also, a left-right direction of the vehicle is indicated as y in FIG. 1.

The front window 1 is provided with an inclination wherein a down side of the inclination is a front side xa of the vehicle. The bracket 3 is fixed to a face 1a inside the vehicle of the front window 1. In a state wherein the bracket 3 is fixed to the front window, the vehicle mount camera 2 is fixed by sliding movement relative to the bracket 3, so that the vehicle mount camera 2 is fixed to the front window 1.

In the illustrated embodiment, the vehicle mount camera 2 is fitted to the bracket 3 by a sliding-movement operation substantially along the vehicle front-rear direction x from the rear side xb of the vehicle to the vehicle front side xa.

In the illustrated embodiment, the vehicle mount camera 2 is attached to the front window 1 through the bracket 3 such that an light entering portion 2a for taking an image faces the front side xa. In FIG. 7, numeral 2b is a camera main body. In the illustrated embodiment, the camera main body 2b includes a step 2e, which faces the front side xa, between a front end portion 2c and a rear end portion 2d, the step 2e having the light entering portion 2a. The camera main body 2b has a size between the front end portion 2c and the rear end portion 2b to be small in the up-down direction, and a size between the step 2e and the rear end portion 2d to be large in the up-down direction.

The bracket 3 includes a base portion 4 fixed to the face 1a inside the front window 1 as the window glass, and an end portion located at a rear side in the movement by the sliding operation of the vehicle mount camera 2, i.e. in the illustrated embodiment, an engagement piece 5 for engaging the rear end portion 2d to an engagement portion 5a.

The engagement piece 5 includes a fixed end 5e integrated with the base portion 4, and a free end 5f arranged with a space relative to the fixed end 5e in the vehicle front-rear direction x. In the illustrated embodiment, the engagement piece 5 is arranged such that the fixed end 5e is located at the rear end side 4b of the base portion and at the middle of the base 4 in the left-right direction of the vehicle, and the free end 5f is located at a rear side of the fixed end 5e. In the illustrated embodiment, the free end 5f of the engagement piece 5 projects slightly rearward from the rear end 4b of the base portion 4.

The engagement piece 5 includes an engagement portion 5a at the free end 5f. In the illustrated embodiment, the engagement portion 5a has a projection shape projecting downwardly.

Also, the engagement piece 5 allows the sliding operation of the vehicle mount camera 2 by the elastic deformation of the engagement piece 5 through an abutment of the engagement portion 5a to the vehicle mount camera 2, and causing the engagement of the engagement portion 5a by the elastic recovery of the engagement piece 5 at an end position of the sliding operation.

Accordingly, in the embodiment of the invention, in a state wherein the bracket 3 is fixed to the front window 1 as the window glass, by fitting the vehicle mount camera 2 to the bracket 3 by the sliding operation, the engagement portion 5a of the engagement piece 5 is engaged, by one touch, with the end of the vehicle mount camera 2 located at the rear side of the above movement of the camera, so that the vehicle mount camera 2 can be stably attached to the window glass. Namely, the vehicle mount camera 2 is prevented from the movement opposite to the slide operation by the engagement, and is held in the predetermined fixing position relative to the bracket 3. The engagement piece 5 is integrated with the base portion 4 fixed to the window glass at the fixed end 5e, and has the structure such that the engagement portion 5a is formed at the free end 5f spaced with respect to the fixed end 5e in the front-back direction x of the vehicle. Thus, it is not necessary to provide in the bracket 3 a portion facing the end located at the rear side of the vehicle mount camera 2 and a spring and so on in the bracket 3 elastically pushed from this portion to the end located at the rear end side in the above movement of the vehicle mount camera 2. Thus, the size of the bracket 3 in the vehicle from-back direction x is minimized Namely, a free designing of the bracket 3 is enhanced, and the structure of the bracket is simplified. Also, an occupation area of the bracket 3 to the window glass is minimized as well.

In the illustrated embodiment, the bracket 3 is provided with the base portion 4, the engagement piece 5, a font support portion 6 supporting the front end portion 2c of the vehicle mount camera 2, and a rear support portion 7 supporting the rear end portion 2d of the vehicle mount camera 2.

An open portion 4e is formed between the front end 4a and the rear end 4b of the base 4, the open portion receiving the light entering portion 2a of the vehicle mount camera 2 from the rear side xb of the vehicle along the slide operation of the vehicle mount camera 2.

At a position between the front end 4a and the open portion 4e in the upper face 4c of the base portion 4, a light leading groove 4f is formed where a groove width in the left-right direction y is gradually narrowed as it approaches the open portion 4e.

Figure 1:
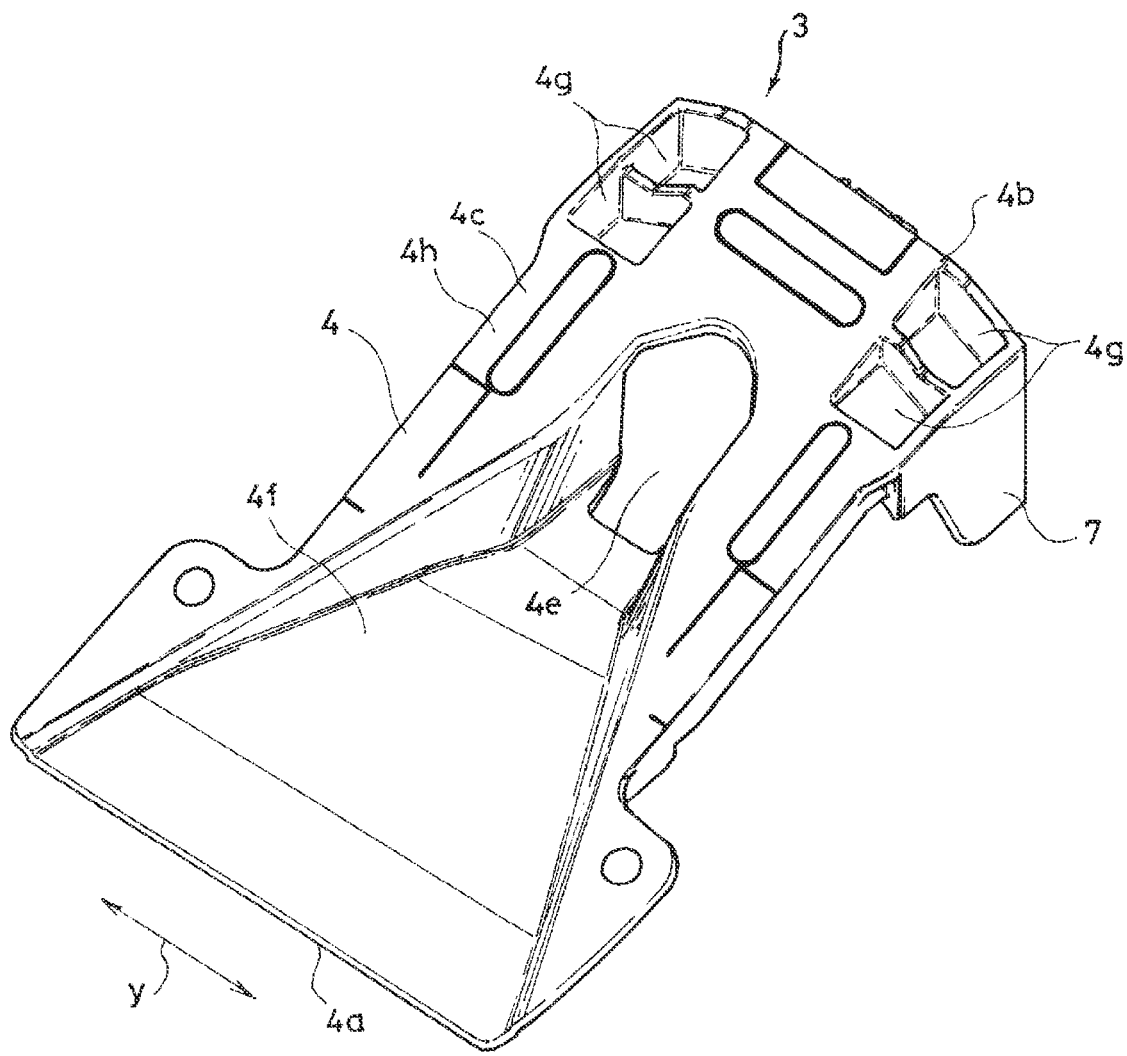
FIG. 1 is a perspective view showing, from an upper side, a bracket of one embodiment of the invention.
Figure 2:
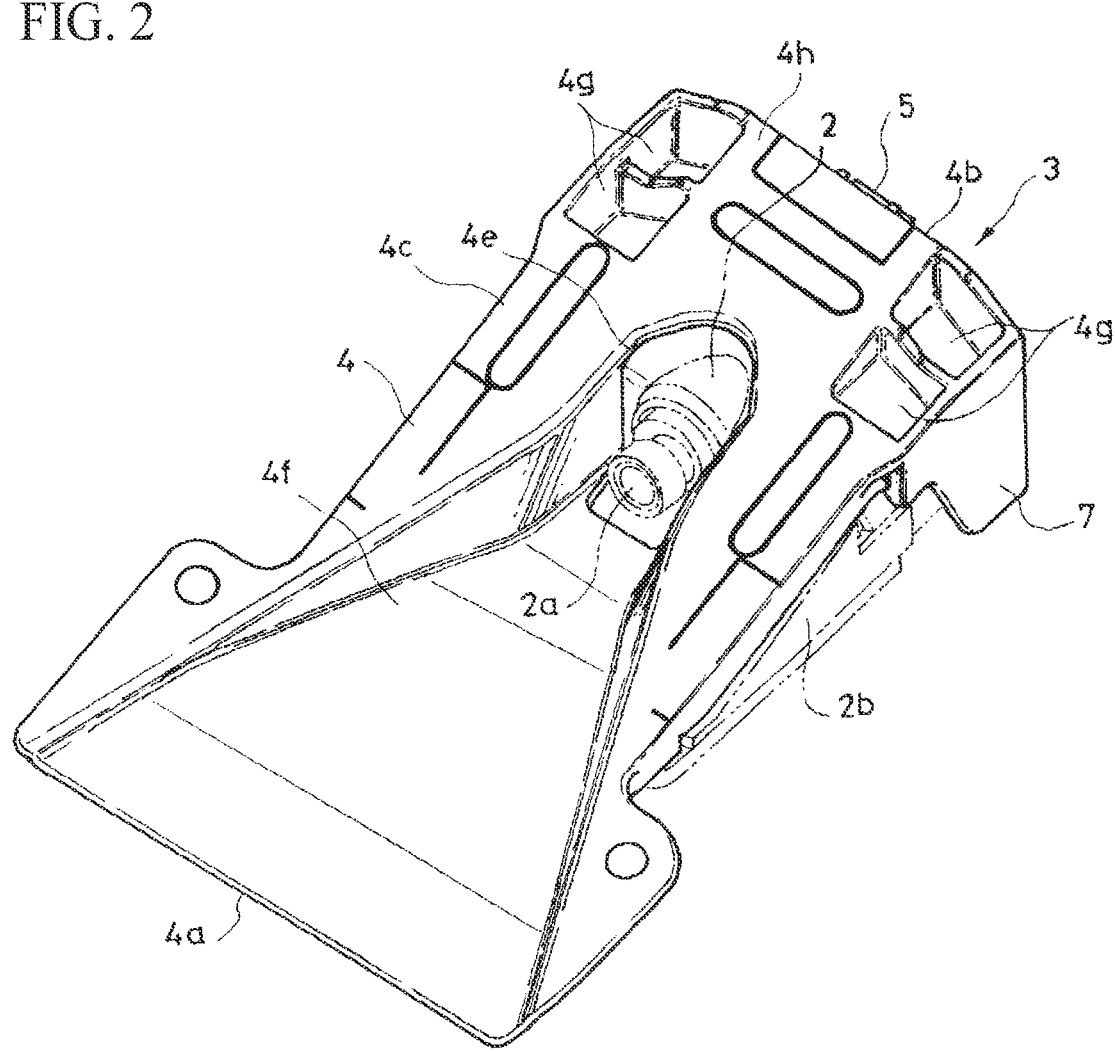
FIG. 2 is a perspective view showing, from the upper side, the bracket showing a state combining a vehicle mount camera wherein the vehicle mount camera is shown in an imaginary line (two dot lines).
Figure 3:
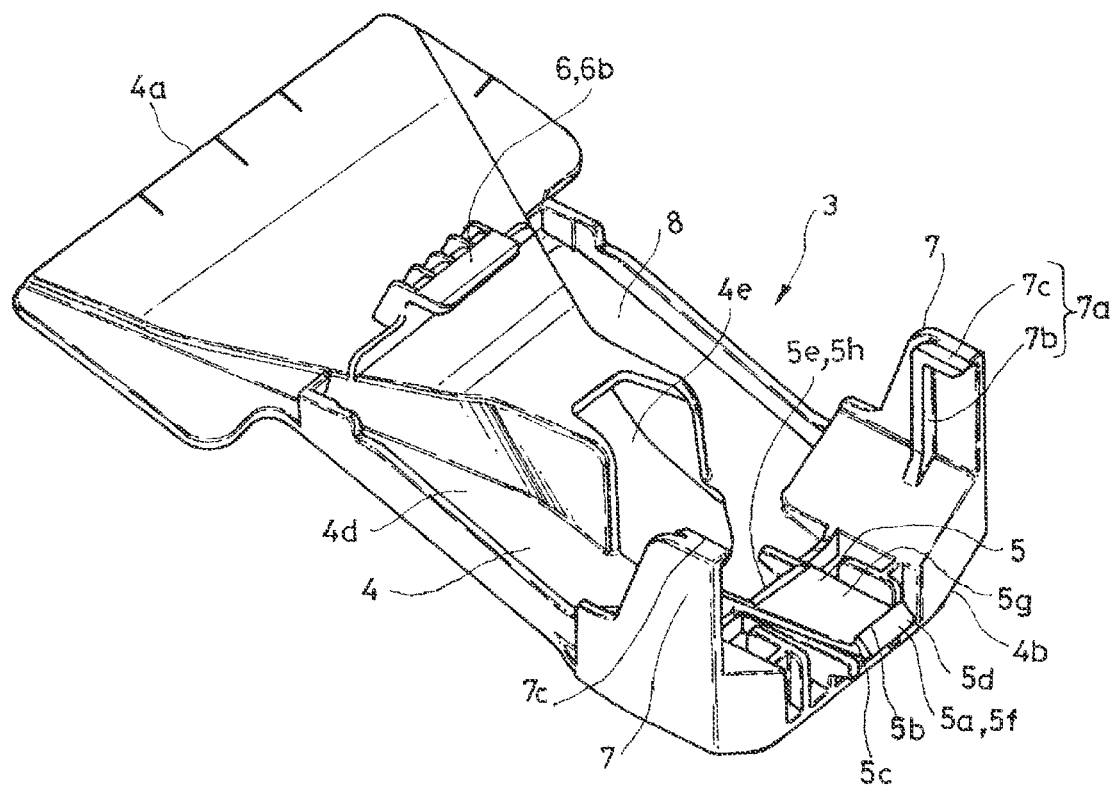
FIG. 3 is a perspective view showing, from a lower side, the bracket.
Figure 4:
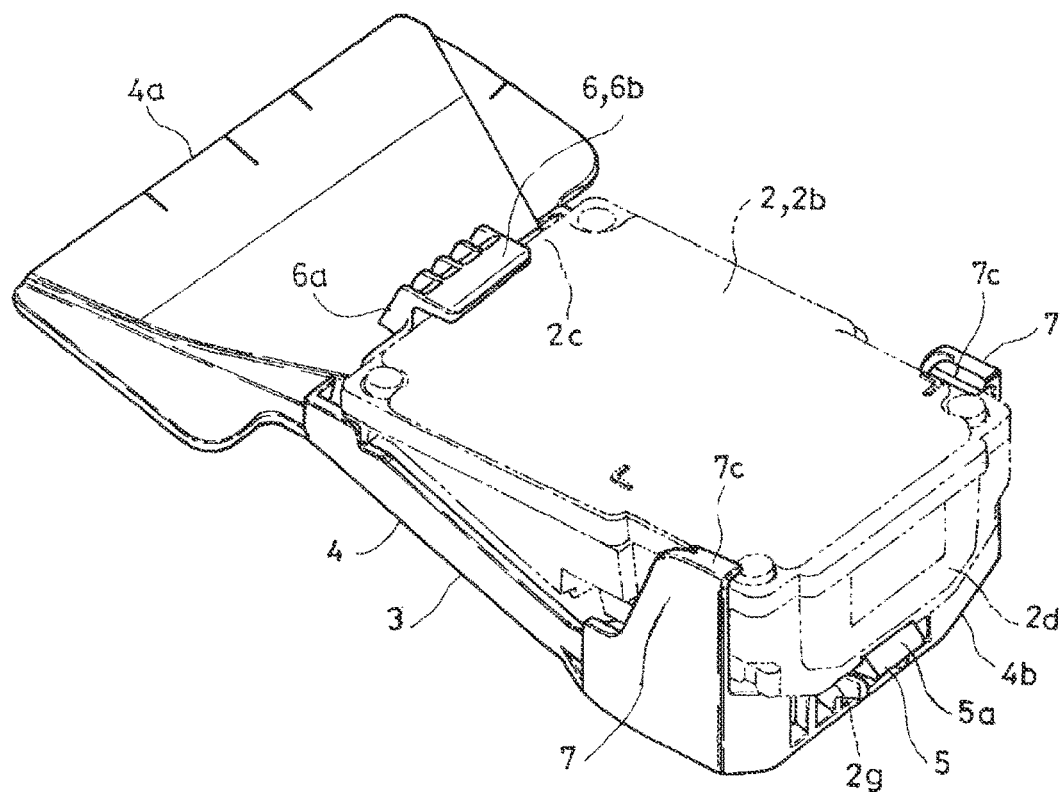
FIG. 4 is a perspective view showing, from the lower side, the bracket showing a state combining the vehicle mount camera wherein the vehicle mount camera is shown in an imaginary line (two dot lines).
Figure 5:
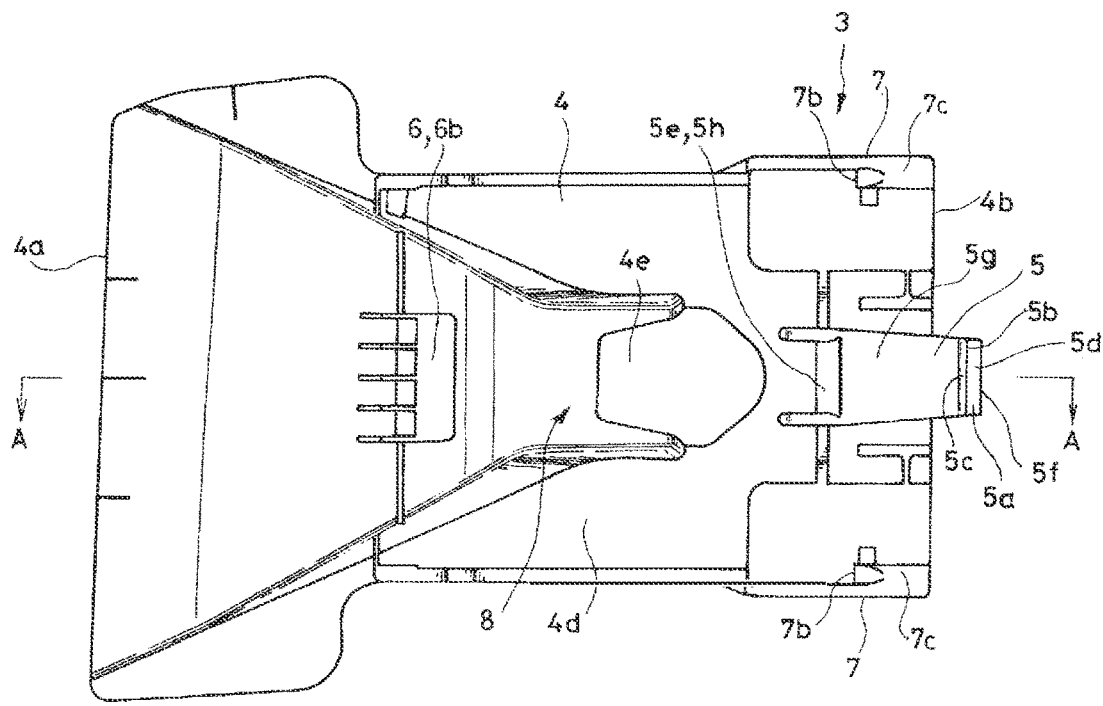
FIG. 5 is a bottom view of the bracket.
Figure 6:
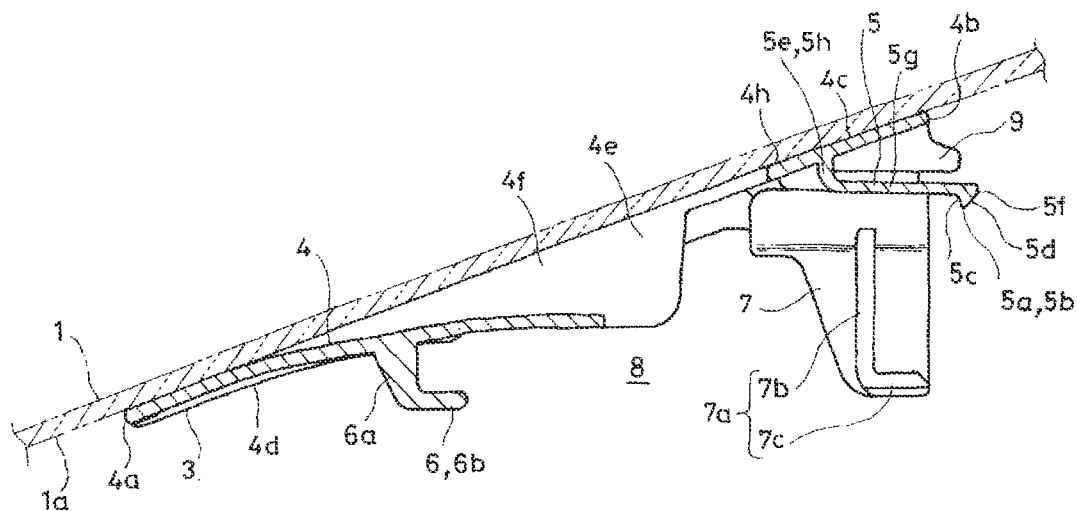
FIG. 6 is a cross-sectional view taken along line A-A in FIG. 5, showing a state wherein the bracket is fixed to a window glass.

A portion in the upper face 4c of the base 4 except the light leading groove 4f and except a thin portion indicated as 4g in FIG. 1 is an attaching face 4h relative to the front window 1. In the illustrated embodiment, the bracket 3 is fixed to the front window 1 by adhesion using the attaching face 4h. The attaching face 4h as a whole is fixed to closely contact the face 1a of the vehicle inner side of the front window 1, and has the inclination similar to the inclination of the front window 1.

The front support portion 6 is located in the middle in the left-right direction y between the front end 4a and the open portion 4e of the base portion 4. The front support portion 6 includes a base portion 6a projecting vertically from the bottom face 4d of the base 4, and a projecting portion 6b projecting rearward of the vehicle from the lower end of the base portion 6a, and has a hook shape in section. Upon sliding operation of the vehicle mount camera 2 to fit in the bracket 3 from the rear direction in the direction along the front-rear direction x of the vehicle from a state where the bracket 3 is fixed to the front window 1, the front end 2c of the vehicle mount camera 2 enters between the lower face 4d of the base 4 and the projecting portion 6b. At the fitting end position (FIG. 7), the front end 2c abuts against the base portion 6a, and the projecting portion 6b supports the front end 2c from the lower side.

Rear support portions 7 are provided respectively with a corner where the rear end 4b of the base portion 4 contacts one side along the front-rear direction, and a corner where the rear end 4b of the base portion 4 contacts the other side along the front-rear direction. Namely, in the illustrated embodiment, the rear support portions 7 are respectively provided at the left and right of the base portion 4. A distance between the inner faces of the left and right of the rear support portions 7 (faces facing the other rear support portions 7) is substantially the same as the size of the left-right direction of the vehicle mount camera 2. In each of an inner surface of the left and right rear support portions 7, a support rib portion 7a including a vertical rib portion 7b extending vertically and a lateral rib portion 7c extending rearward from the lower end of the vertical rib portion 7b is formed. In the illustrated embodiment, a distance between the lateral rib portion 7b of the support portion 7 and a portion 5g of the engagement piece 5, which is from the fixed end 5e of the engagement piece 5 to the engagement portion 5a, is substantially the same as the upper-lower size at the rear end 2d of the vehicle mount camera 1. Upon sliding operation of the vehicle mount camera 2 to fit in the bracket 3 from the rear direction in the direction along the front-rear direction x of the vehicle from a state where the bracket 3 is fixed to the front window 1, at the fitting end position (FIG. 7), step portions, not show, formed at left and right faces at the rear end 2d of the vehicle mount camera 2 abut against the vertical rib portions 7b, and the lateral rib portions 7c support the bottom of the rear end portion 2d of the vehicle mount camera from below.

Namely, in the illustrated embodiment, the vehicle mount camera 2 is fitted in a fitting space 8 formed by the lower face 4d of the base portion 4 of the bracket 3, the front support portion 6 and the left and right rear support portions 7 by the slide operation from the rear side xb of the vehicle.

The engagement piece 5 abuts, at the engagement portion 5a, against a portion 2f between the light entering portion 2a and the rear end portion 2d in the upper surface of the vehicle mount camera 2 in the course of the sliding operation of the vehicle mount camera.

The engagement pierce 5 shows a plate shape, between the open portion 4e and the rear end 4b of the base portion 4, having wide upper and lower plate faces extending substantially horizontally rearward from a base portion 5h projecting downward from a lower face 4d of the base portion 4, and the base portion 5h comes to the fixed end 5e. A space 9 increasing as it approaches the free end 5f of the engagement piece 5 is formed between the engagement piece 5 and the lower face 4d of the base portion 4.

The engagement portion 5a shows a rib shape at the free end 5f of the engagement piece 5, extending in the left-right direction of the engagement piece 5.

The engagement portion 5a becomes a contact face 5c, at one side with respect to the top portion 5b, contacting the vehicle mount camera 5 at the time of engagement with the vehicle mount camera 2, and an inclined face 5d at the other side with respect to the top portion 5b. In the illustrated embodiment, a contact face 5c is formed, at the front side of the engagement portion 5a, substantially along a vertical direction, and the inclined face 5d is formed at the rear side of the engagement portion 5a. The engagement portion 5a has, by the inclined face 5d, a shape gradually reducing a size toward the top portion 5b in the front-rear direction x.

In the illustrated embodiment, during the sliding operation of the vehicle mount camera 2, the engagement portion 5a abuts against, at the inclined face 5d, a portion between the light entering portion 2a and the rear end portion 2d in the upper surface of the vehicle mount camera 2. Upon the abutment, the engagement portion 5a smoothly deforms elastically upwardly by the inclined face 5d, and introduction of the rear end 2d of the vehicle mount camera 2 between the lateral rib portions 7c and the engagement portion 5a is permitted. Upon completion of fitting of the vehicle mount camera 2 to the bracket 3, in particular, when the vehicle mount camera 2 is fitted to the position until the front end portion 2c of the vehicle mount camera 2 contacts the base portion 6a of the front support portion 6, the top portion 5b of the engagement portion 5a is positioned at a rear side relative to an end portion 2g where the upper face of the rear end portion 2d of the vehicle mount camera 2 and the rear end portion 2d contact, so that the engagement piece 5 elastically returns, and the engagement portion 5a engages the rear end portion 2d while contacting the contact face 5c to the rear end portion 2d. As a result, the vehicle mount camera is stably retained inside the bracket 3.

In the illustrated embodiment, the bracket 3 is an injection molded product of a synthetic resin. As a result, the bracket 3 is made as one piece, and it is possible to rationally provide a required elastic deformation characteristic to the engagement piece 5.

Incidentally, needless to say, the present invention is not limited to the above embodiment, and includes all the embodiments achieving the object of the invention.

EXPLANATION OF NUMERALS 1a face inside a vehicle
2 vehicle mount camera
4 base portion
5 engagement piece
5a engagement portion
5e fixed end
5f free end
x vehicle front-rear direction Incidentally, the specification, claims, drawings and abstract of Japanese Patent Application No. 2019-012894 filed on Jan. 19, 2019 are incorporated herein in their entireties as a disclosure of the invention.

What is claimed is:
1. A bracket for attaching to a window glass a vehicle mount camera for taking an image outside a vehicle through the window glass, comprising:
    a base portion arranged to be fixed to a face inside the window glass,
    an engagement piece having an engagement portion configured to engage an end of the vehicle mount camera, located at a rear side in a sliding movement, by a sliding operation of the vehicle mount camera, and
    rear support portions, each being arranged on a corner of a side and a rear of the base portion, laterally outside the engagement piece configured to support the vehicle mount camera,
    wherein the engagement piece includes a fixed end integrated with the base portion, and a free end arranged with a space relative to the fixed end in a vehicle front-rear direction, the engagement portion being provided at the free end so that the sliding operation of the vehicle mount camera is made by an elastic deformation of the engagement piece through an abutment of the engagement portion to the vehicle mount camera, and an engagement of the engagement portion is made by an elastic recovery of the engagement piece at an end position of the sliding operation.

2. A bracket according to claim 1, wherein the bracket is an injection molded product of a synthetic resin.

3. A bracket according to claim 1, wherein the engagement portion has a projection shape projecting downwardly, and a contact face at one side with respect to a top portion, contacting the vehicle mount camera at a time of engagement with the vehicle mount camera, and an inclined face at another side with respect to the top portion.

4. A bracket according to claim 1, wherein each of the rear support portions includes a vertical rib portion extending vertically relative to the base portion, and a lateral rib portion extending rearward from a lower end of the vertical rib portion configured to support a bottom of a rear end portion of the vehicle mount camera.

5. A bracket according to claim 4, further comprising a front support portion having a support base projecting vertically from a bottom face of the base portion, and a projecting portion projecting rearward from a rear end of the support base.

\* \* \* \* \*